United States Patent [19]

Crile et al.

[11] 4,238,177

[45] Dec. 9, 1980

[54] MOLDING MACHINE WITH VIBRATION ISOLATION

[76] Inventors: Eugene E. Crile, 3801 E. Stella La., Paradise Valley, Ariz. 85253; Donald D. Schwellenbach, 4520 W. Bryce La., Glendale, Ariz. 85301

[21] Appl. No.: 899,582

[22] Filed: Apr. 24, 1978

[51] Int. Cl.³ ............................................... B29C 1/16

[52] U.S. Cl. ...................................... 425/150; 264/71; 425/211; 425/424; 425/432

[58] Field of Search .................. 264/71; 425/150, 211, 425/424, 432

[56] References Cited

U.S. PATENT DOCUMENTS

| | | | |
|---|---|---|---|
| 2,342,440 | 2/1944 | Whitsitt . | |
| 2,671,260 | 3/1954 | Jessen | 425/211 |
| 2,698,475 | 1/1955 | Davis | 264/71 |
| 3,277,551 | 10/1966 | Sekiguchi | 264/71 |
| 3,660,004 | 5/1972 | Woelk . | |
| 3,833,331 | 9/1974 | Springs | 264/71 |
| 4,111,627 | 9/1978 | Kitohara | 425/432 |

*Primary Examiner*—John A. Parrish
*Attorney, Agent, or Firm*—LaValle D. Ptak

[57] ABSTRACT

A concrete block molding machine has the pallet support table mounted on the main frame of the machine through pneumatic tires which provide vibration isolation between the pallet support table and the main machine frame. A mold, having vibrating mechanism mounted on it is lowered into position on pallets supported by the pallet support table, and the mold and pallet support table are clamped together on opposite sides of a pallet during the molding operation. A plunger head is carried on the main machine frame through additional air bag vibration isolators to engage materials in the mold to compact them during the molding operation while the vibrators are operating. Upon completion of the molding operation, the table and mold are unclamped to permit a stripping plate to move the mold upwardly off of the pallet; so that the pallet and the green concrete blocks may be moved out of the machine and a new pallet may be positioned for the next cycle of operation.

16 Claims, 10 Drawing Figures

MOLDING MACHINE WITH VIBRATION ISOLATION

BACKGROUND OF THE INVENTION

Molding machines such as those which are used to mold concrete blocks and similar products are typically large, heavy and noisy. In the commercial production of concrete blocks, higher speed operation of the molding machines and a more uniform quality of the blocks produced is accomplished by vibrating the mold during the block formation. This reduces the time necessary to compact the concrete into the mold and minimizes the possibility of the formation of voids in the blocks produced.

Blocks produced in a concrete block molding machine are stripped from the molds and placed on pallets used to convey the green or uncured blocks from the mold. The pallet generally is located beneath the open bottom of the mold and serves to close the bottom of the mold during the molding operation. In the past, when the mold was vibrated, with or without simultaneous vibration of the pallet, the mold assembly and pallet tended to separate during each cycle of vibration, causing substantial noise and allowing some leakage of the block material between the mold and pallet, resulting in the formation of burrs on the bottom of the blocks.

In order to overcome the problems of separation of the mold and pallet and thereby eliminate burrs from the bottoms of the blocks, some attempts have been made in the past to clamp together the mold and pallet during the vibration cycle of operation of the mold making machine; so that the mold and pallet vibrate together as a unit. One such prior art solution is disclosed in the U.S. Pat. No. 2,342,440 to Whitsitt, issued Feb. 22, 1944. In the Whitsitt patent a clamping mechanism in the form of pivoted hooks is used to secure the mold box, pallet and pallet support table together during the vibration cycle of operation. No isolation of these vibrating parts from the main frame of the machine is present, however; so that substantial stress is placed on the machine frame during its operation. In fact, without vibration isolation, extensive heavy and expensive anchoring techniques must be employed to prevent the machine from bouncing around and moving from its position during its operation. The vibration which is imparted to the main frame of the machine rapidly accelerates fatigue which can lead to premature failure of the machine. Such failure necessitates expensive repairs and lost time during periods of inoperation for purposes of repairing the machine. In addition, the pivotal clamps used in the machine of the Whitsitt patent are subjected to considerable strain at the pivot point and require relatively complex operating mechanisms to move them between their open and closed or clamped positions.

Another attempted solution in the prior art is disclosed in U.S. Pat. No. 3,660,004, to Robert J. Woelk, issued May 2, 1972. This patent also discloses concrete block molding machinery having apparatus for moving a block receiving pallet against the mold assembly used in forming the concrete blocks. An auxiliary table carried by the main pallet support table has rotatable clamp arms on it for engaging clamp receiving members on the mold box, and these arms are movable in and out of engagement with the receiving members on the mold box to correspondingly clamp the auxiliary table, pallet and mold box together during the vibration portion of the cycle of operation of the machine. The arms are subsequently disengaged to permit stripping of the mold and removal of the pallet during other portions of the machine operation.

As with Whitsitt, the apparatus disclosed in the Woelk patent does clamp the pallet tightly against the bottom of the mold box during the vibration operation; so that the elimination of burrs from the bottom of the blocks is effected. Woelk, however, requires an auxiliary pallet support table in addition to the main pallet support table; and the entire assembly of mold box, pallet and auxiliary pallet support table rests on top of the main pallet support table during the vibration operation. Resilient upper surfaces are provided on the main pallet support table in an attempt to isolate vibration of the mold box/pallet assembly from the rest of the machine, but necessarily these surfaces must be fairly rigid to permit their main function of serving as a firm support for the pallet in the machine. As a consequence, substantial vibration is imparted to the main pallet support table and from it to the main machine frame when the machine of Woelk is operated. As a consequence, the problems inherent with transmitting the vibration of the mold box to the main machine frame, discussed above in conjunction with the Whitsitt patent, are inherent also in apparatus built in accordance with the Woelk patent.

The machine of the Woelk patent also uses rotatable clamping arms to effect the clamping operation, and the mechanism for moving these arms from the unclamped to the clamped position and back again is quite complicated. This results in higher initial manufacturing costs; and in the hostile environment in which the machine is operated, inherently results in increased maintenance costs because of the number of different parts which are likely to fail in the operation of such a machine.

In addition to the disadvantages noted above in prior art molding machines, such as concrete block making machines, the noise produced by such machines is deafening and far exceeds acceptable work environment standards. As a consequence, it is desirable to provide a simplified concrete block making machine which has the advantages of clamping the pallet firmly against the bottom of the mold during the vibration portion of the machine operation to eliminate noise caused by the mold hitting the pallet and which also uses a simplified mechanism for achieving this result. Also, it is desirable to reduce the noise of operation of concrete block making machines and further to isolate the vibration only to those parts of the machine which must be vibrated to accomplish the desired results of improved molding of concrete blocks and similar products.

SUMMARY OF THE INVENTION

Accordingly, it is an object of this invention to provide an improved molding machine.

It is another object of this invention to provide an improved concrete block making machine.

It is an additional object of this invention to provide an improved concrete block making machine with effective vibration isolation between those parts of the machine which are to be vibrated and the remainder of the machine.

It is a further object of this invention to provide an improved concrete block making machine which minimizes the noise generated by the machine during its operation.

And it is still another object of this invention to provide an improved concrete block making machine of simplified construction.

In accordance with a preferred embodiment of this invention, a molding machine which may be used to mold concrete blocks and the like has a frame on which a pallet support table is mounted by means of vibration isolation mounting devices. A mold member is located above the support table and is adapted to be supported by the support table. The machine includes means for relatively moving the support table and the mold member toward and away from one another, and a clamp is mounted on one or the other of the table and the mold member. A clamp receiving member is mounted on the other of the table and the mold member and a drive mechanism is used to move the clamp and the clamp receiving member into engagement with one another to clamp the support table and the mold member together.

In a more specific embodiment of the invention, the support table is used to support pallets on which the objects to be molded are deposited and the mold member has an open end located above the support table. When the clamp and clamp receiving means are driven into engagement with one another, they clamp the support table and the mold member on opposite sides of the pallet to secure the support table, the pallet and the mold member together during the molding operation of the machine.

DETAILED DESCRIPTION OF THE PREFERRED EMBODIMENT

Figure 1A:
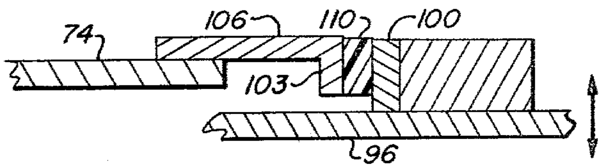
FIG. 1A illustrates details of a portion of the machine of FIG. 1.

Referring now to the drawings, the same reference numbers are used throughout the several figures to designate the same or similar components.

Figure 1:
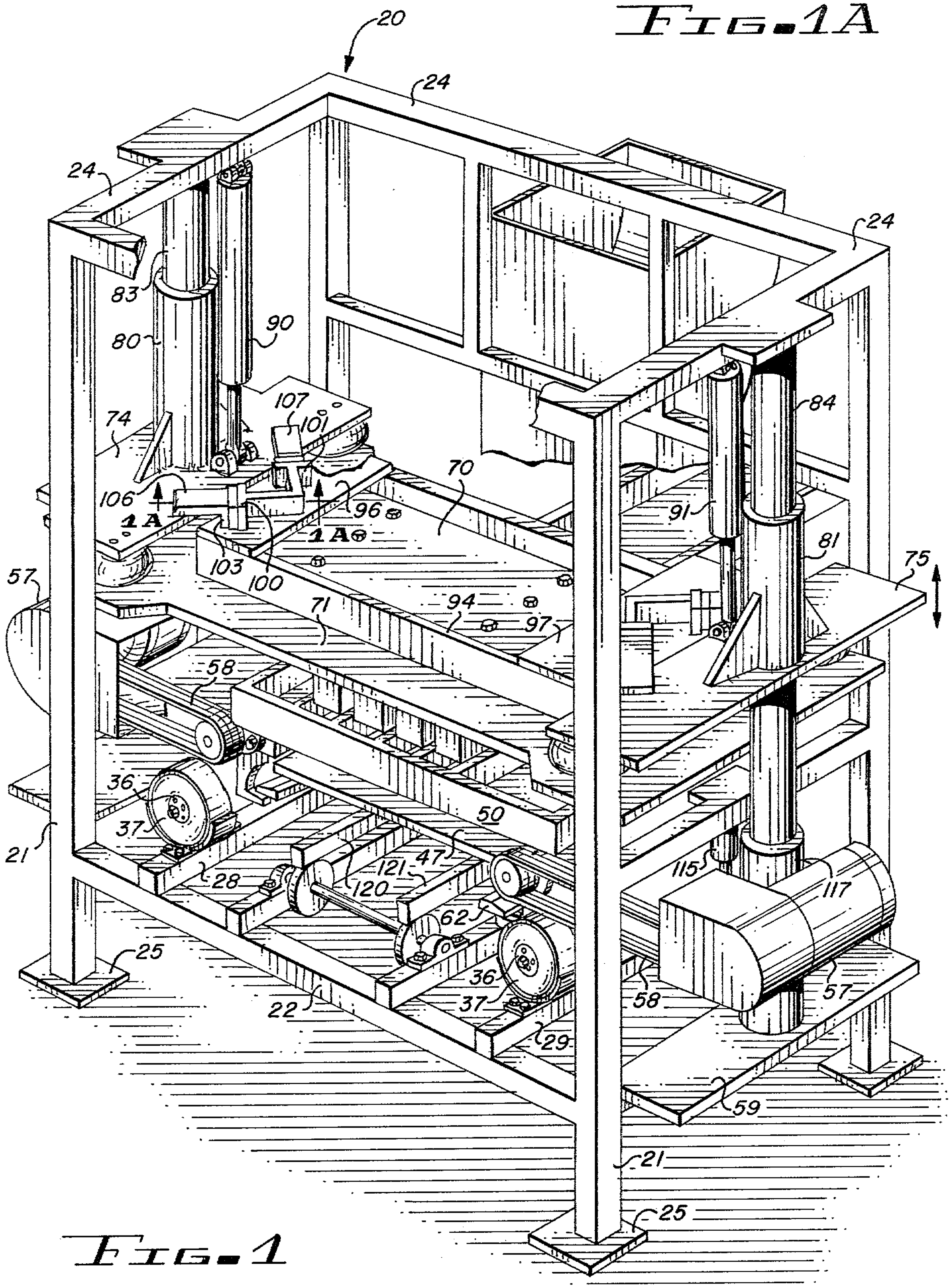
FIG. 1 is a front perspective view of a preferred embodiment of the invention, with some parts broken away to more clearly illustrate the invention.
Figure 2:
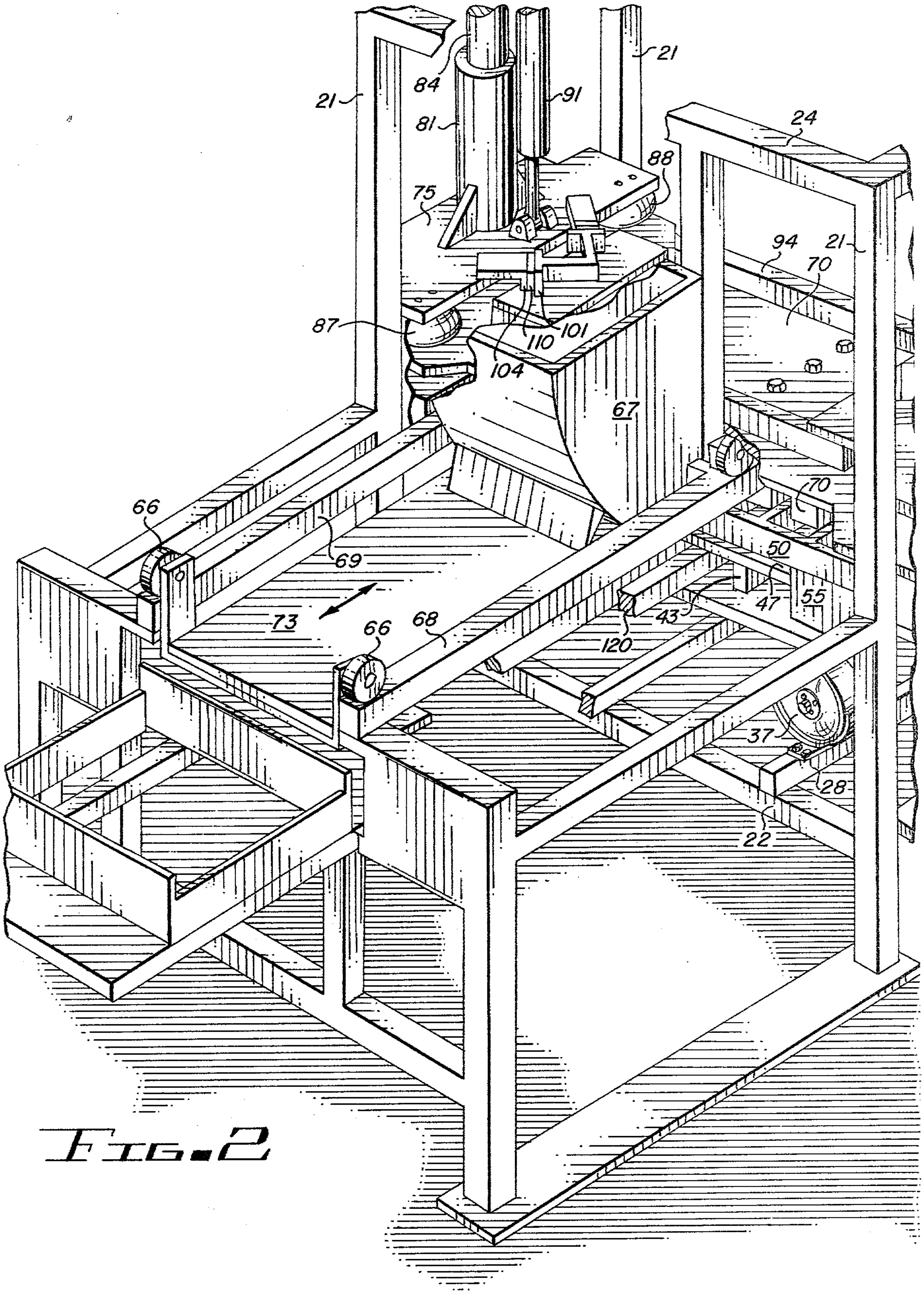
FIG. 2 is a partial rear perspective view of the apparatus shown in FIG. 1.
Figure 3:
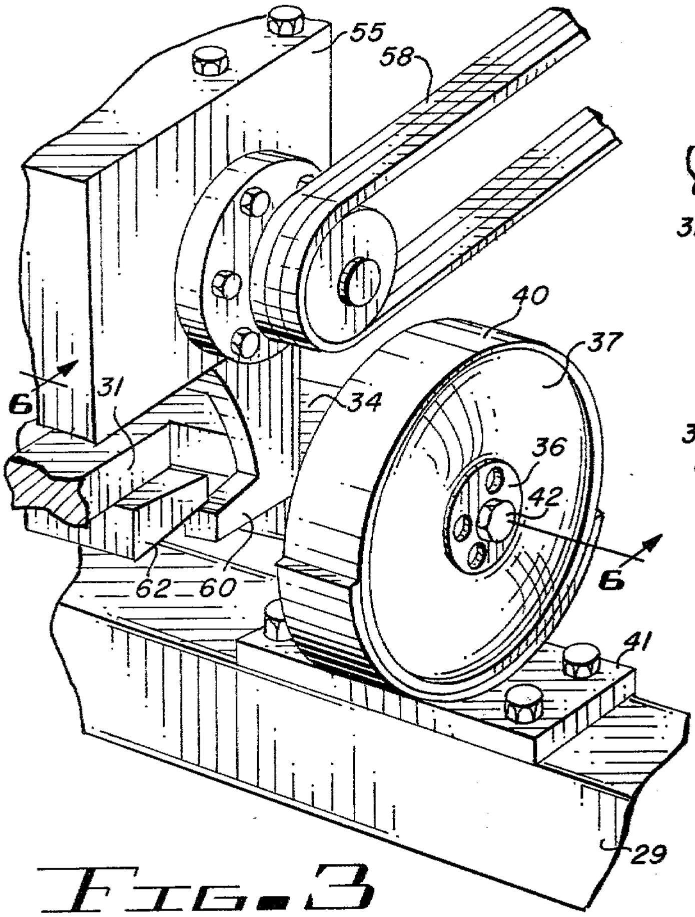
FIGS. 3, 4, 5 and 6 illustrate details of a portion of the apparatus shown in FIGS. 1 and 2.
Figure 4:
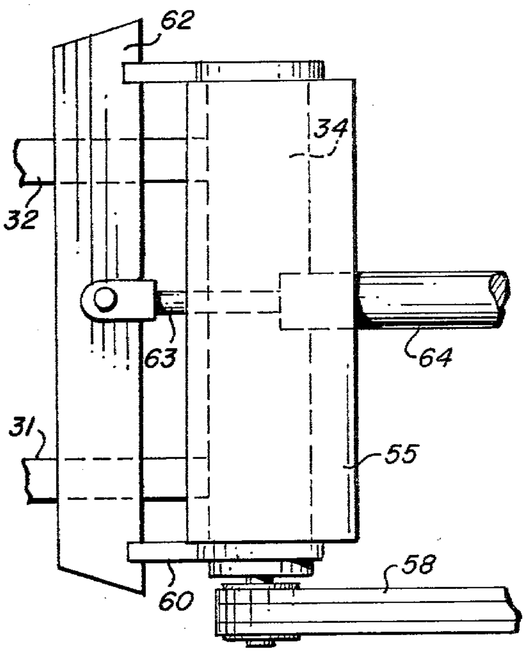
Figure 6:
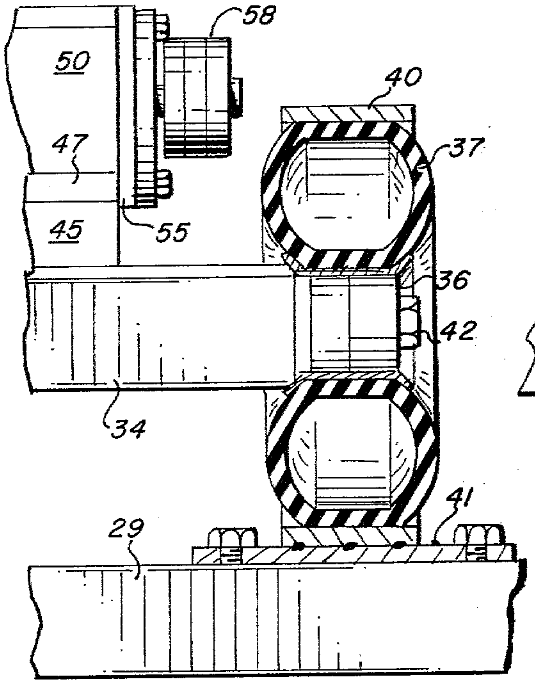
Figure 5:
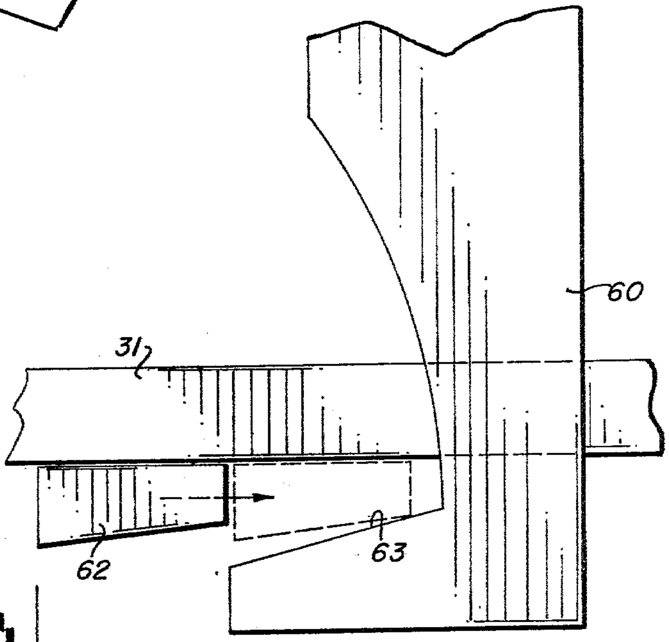

Reference first should be made to FIGS. 1 and 2 which are perspective views of the front and back of a machine constructed in accordance with a preferred embodiment of the invention. The machine itself comprises a main generally rectangular frame 20 having four vertical support frame members 21 at each of the corners. The vertical support members 21 are interconnected at the top and bottom by horizontal frame members 22 and 24, respectively. The machine shown in FIGS. 1 and 2 is a concrete block making machine and the vertical support members 21 are several feet in height, and the width and length of the machine defined by the length of the support members 22 and 24 also is several feet in each direction.

Each of the vertical support members 21 rests on pads 25 which typically are bolted to the floor of the building in which the machine is installed. Because of the vibration isolation which is provided in the machine shown in FIGS. 1 and 2, and which is described in detail subsequently, it may not be necessary to bolt the machine to the floor; but it may be placed in position without fastening it or anchoring it in any way to a foundation. This is in direct contrast with machines of the prior art which require extensive anchoring to a strong foundation to prevent such prior art machines from moving about as a result of the vibration applied to the molds during their operation.

Concrete block making machines include, in various forms, a pallet support table which is used to support pallets on which the concrete blocks are formed and carried away from the machine for curing. In addition, a mold which is vertically movable relative to the pallet support table is provided for forming the concrete blocks on the pallet; and a feed drawer and hopper for the concrete are utilized to supply measured amounts of concrete into the mold for each cycle of operation of the machine. As discussed above, most modern concrete block making machines also include a vibrator for vibrating at least the mold during the block forming portion of the cycle of operation of the machine to insure a proper compaction of the concrete and remove voids from the blocks being formed.

All of these elements are present in the machine shown in FIGS. 1 and 2, but are mounted on the machine frame 20 and operated in such a way that vibrations from the vibrator are isolated from the frame members 21, 22 and 24 of the machine and are localized in only the portion of the machine where these vibrations are needed. To accomplish this, a pair of horizontal cross members 28 and 29 extend across the lower front and back horizontal frame members 22 of the machine to support the pallet support table. The pallet support table itself includes front and rear horizontal support beams 31 and 32 interconnected at each of their ends by side support beams 34 (shown most clearly in FIGS. 3, 4, 5 and 6) to form a lower rectangular frame. The end members 34 of this frame are bolted to four wheels 36 on which are mounted four pneumatic tires 37 of the type commonly used on motor vehicles such as automobiles, trailers and the like. The tires 37 each are placed inside a steel ring 40 which is welded to or othwerwise suitably fastened to a mounting plate 41, which in turn is bolted or otherwise suitably attached to the cross members 28 and 29 supported by the main frame.

The installation of the pallet support table including the lower horizontal frame 31, 32, 34 is effected by first mounting the wheels 36 and tires 37 in the steel rings 40. The frame members 34 then are attached to the wheels 36, on which the tires 37 are mounted, by means of bolts 42 or other suitable fasteners. After this installation has been completed, the tires 37 are inflated. This causes them to press tightly against the inside of the rings 40 and to firmly hold the pallet support table frame in place on the main frame of the machine 20. In addition, the inherent resiliency of the inflated tires 37 provides vibration isolation between the frame comprising the members 31, 32 and 34 of the pallet support table and the main frame of the machine to which the cross members 28 and 29 are attached.

The pallet support table includes several elongated pallet support bars 43, 44 and 45 extending horizontally across the pallet support table from front to back in the machine. When a pallet 47 of the type conventionally used in such machines is in place for the purpose of having concrete blocks molded on it, it rests on the support members 43, 44 and 45 (shown most clearly in FIGS. 7 and 8). The upper surfaces of the pallet support members 43, 44 and 45 perferably are formed of relatively hard resilient material such as hard rubber or the like to accommodate minor irregularities in the undersurfaces of different pallets 47 which may be placed on the pallet support table. The specific construction of the pallet support table and the manner in which the members 43, 44 and 45 are attached to it is not important and various standard constructions may be used and mounted on the lower frame 31, 32 and 34.

Located directly above the pallet support table is a mold box 50 which may be of any suitable configuration for molding concrete blocks or similar products. The mold box 50 is constructed with a pair of front and back wall support members 51 and 52, respectively, which extend across the width of the machine (shown most clearly in FIG. 8) to overlie stripper plates 53 located on each side of the machine for vertically lifting the mold box 50 up off of the pallet 47 after the molding operation is complete. In the position of the machine operation shown in FIG. 8, the mold box 50 rests on and is supported by the pallet 47, which in turn is supported by the pallet support bars 43, 44 and 45 on the pallet support table. In this position there is clearance between the upper surface of the stripper bars 53 and the underside of the numbers 51 and 52 of the mold box. This clearance is sufficient to permit freedom from interference of vertical vibration of the mold box 50 during the molding operation.

On each end of the mold box 50, a vibrator 55 is attached to the underside of the extensions 51 and 52 in any suitable manner. The vibrators 55 may be of any desired construction, including those commonly used in the industry, to produce limited vertical vibration of the mold 50 during the cycle of operation of the machine in which the concrete is formed into blocks in the mold. The vibrators 55 on each side of the machine are operated by a pair of electric motors 57 which are attached to the stripper plates 53 mounted on movable guide tubes 116 and 117. Power is applied from the motors 57 to the vibrator mechanisms through drive belts 58 (shown most clearly in FIGS. 1 and 3).

In the operation of the vibrators 55, the motors 57 may be started and stopped at the appropriate times in the cycle of operation of the machine to vibrate the mold box 50 during the formation of the concrete blocks and to stop the vibration when the mold box 50 is stripped from the blocks and the green (uncured) blocks are moved out of the machine on the pallet 47. This is followed by the placement of a new pallet 47 underneath the mold box for the next cycle of operation. When the mold then is in place for the next cycle of operation, the motors 57 may be restarted to initiate the vibrating sequence once again.

Other alternatives utilizing vibrators 55 with controls to effect the selective balancing and unbalancing of weights in the vibrators 55 may permit the continuous operation of the motors 57 with the vibration being started and stopped under control of the apparatus which balances and unbalances the weights in the rotating vibrating mass.

Since the vibrators 55 are attached to the mold box, it is important to clamp the pallet 47 tightly against the bottom of the mold box during the operation of the machine to eliminate noise otherwise produced by the mold box bouncing on the pallet and to prevent concrete from leaking out between the open bottom of the mold box and the pallet during the vibrating operation. It is also desirable to firmly clamp the pallet support table to the underside of the pallet 47 during the vibrating cycle of operation and vibrate the mold box, pallet and pallet support table together. To accomplish this purpose, four "C-shaped" or "hook-shaped" clamp receiving members 60 in the form of depending hooks are bolted onto the bottom of the vibrator mechanisms 55 at each corner of the mold box. These clamp receiving members 60 and their relative location with respect to the mold 50 and vibrators 55 are shown most clearly in FIGS. 3 and 8.

The hook-shaped clamp receiving members 60 extend downwardly below the lower surface of the cross members 31 and 32 of the pallet support table, and an elongated clamping wedge 62 is mounted on the end of a piston rod 63 controlled by an air cylinder 64 on each of the cross members 34 at each end of the pallet support table. Each of the wedges 62 is pivotally mounted at its mid-point on the rod 63 for limited angular rotation (of the order of 10° or so) to compensate for alignment variations of the members 60.

Figure 8:
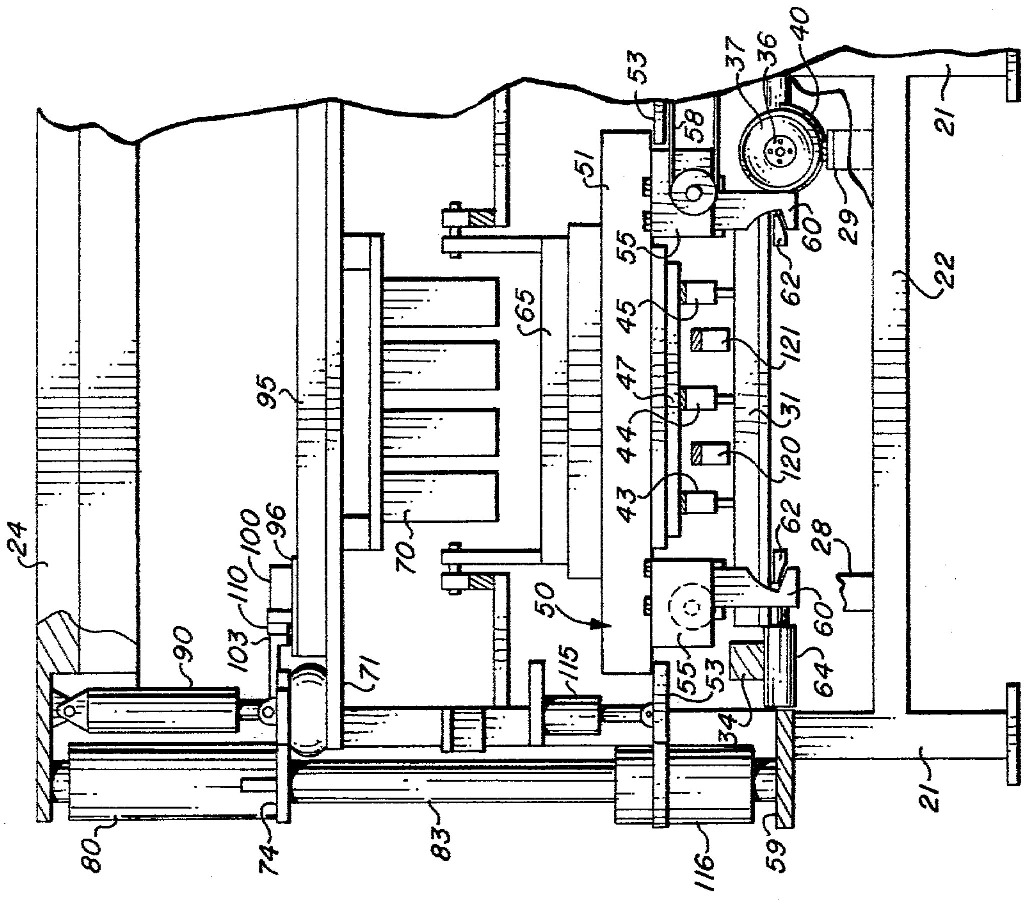
FIG. 8 is a partial front elevational view of the apparatus of FIG. 1 illustrating the relative location of various parts of the apparatus.

When the pistons 64 are activated, the wedges 62 are pulled into the positions shown in FIG. 8 to wedge the upper side of each wedge 62 against the bottom of the cross members 31 and 32 of the pallet support table and to wedge the underside of the wedges 62 onto the upper surfaces 63 of the corresponding clamp receiving members 60. This is shown in the dotted line position of the wedge 62 in FIG. 5 and in solid lines in FIG. 8. In this position, the pallet support table, the pallet 47, and the mold 50 are all clamped together as a unit and vibrate together as a unit under the control of the operation of the vibrators 55 mounted on each end of the mold 50. The tires 37 effectively isolate this vibration from the frame members 28 and 29 to which the retaining rings 40 for the tires 37 are mounted. As a consequence, the vibration is limited to the portions of the machine which need to be vibrated and the remainder of the machine is free from vibration. The tires 37 also significantly reduce the noise level of the machine to a tolerable level and one which is within acceptable work environment standards. In this vibration and molding position, as stated previously, the mold 50 rests on and is supported by the pallet 47 (which in turn is supported by the pallet support table) and is clear of the stripper bars 52; so that it is free to vibrate free of interference.

Once the mold 50 is clamped to the pallet and pallet support table as described above, a concrete feed drawer 65 located beneath a concrete supply hopper 67 is moved from a position where it receives concrete from the hopper toward the front of the machine to deposit concrete in the mold cavities. The feed drawer 65 rolls back and forth on a pair of guide rails 68 and 69 under the support of four rollers 66 (see FIG. 2) and has, on the rear portion thereof, a flat hopper closing surface 73 which closes off the bottom of the hopper 67 when the feed drawer moves to its forward position over the mold box 50. Once the concrete has been deposited in the mold, a plunger head 70 carried by a plunger head carrying plate 71 is lowered into place to cause the plunger head 70 to rest on the concrete in each of the cavities in the mold 50. The plunger head 70 is shaped to matingly engage with the cavities in the mold 50 for the particular shape and configuration of blocks being cast in the mold. The head 70 rests on top of the concrete in the mold and serves to compact the concrete into the mold as the mold is vibrated under the control of the vibrators 55.

The carrying plate 71 for the plunger head 70 is attached to a pair of operating plates 74 and 75 by means of a pair of bolts 77 and 78 for each of the plates 74 and 75. These bolts are firmly attached to the plates 74 and 75 and are slidably mounted in enlarged holes in the carrying plate 71. This is shown most clearly in FIGS. 7, 9 and 10.

The plates 74 and 75 are mounted on corresponding guide tubes 80 and 81 which freely slide vertically on a pair of guide rods 83 and 84. These guide rods run vertically from the top of the machine frame to the bottom and are rigidly attached to the main frame of the machine. Vibration isolation between the plates 74 and 75 and the plunger head mounting plate 71 is provided by resilient air bag isolation members 87 and 88 located at each of the two corners of each end of the plate 71 located beneath the two plates 74 and 75. The air bags 87 and 88 are inflated to a pressure to provide the degree of vibration isolation and resistance which is desired in the machine.

Figure 7:
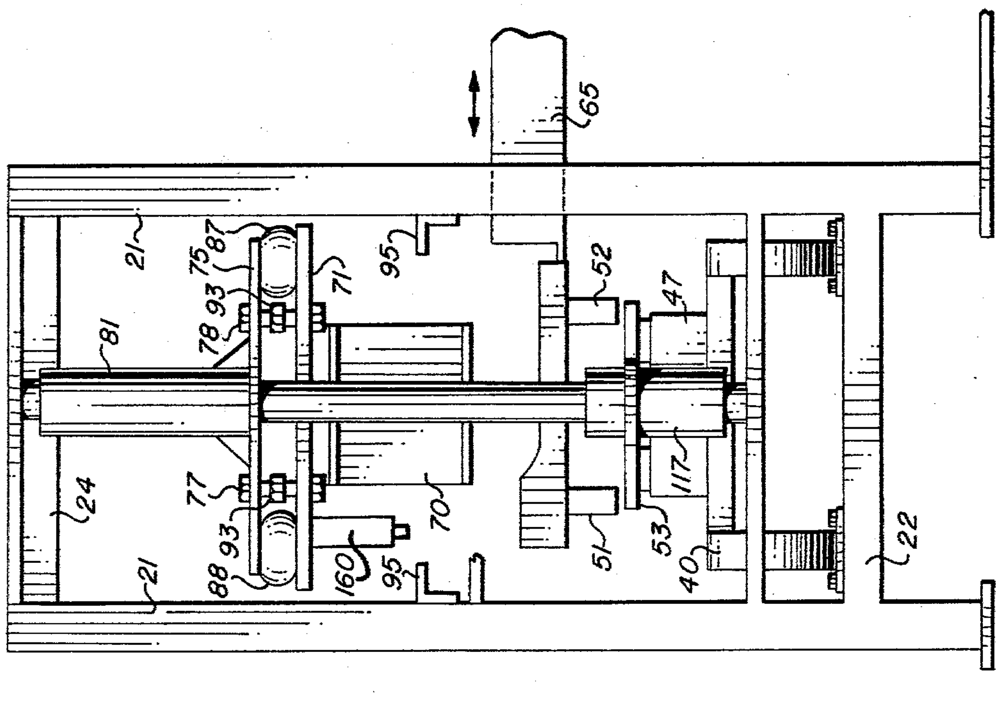
FIG. 7 is a partial side elevational view of the apparatus of FIGS. 1 and 2 showing the relationship of various parts of the apparatus.

When the plunger head 70 is raised to its upper position, as shown in FIGS. 7 and 8, the heads of the bolts 77 and 78 located beneath the plate 71 hold the plate 71 in the position shown and prevent any undue stress from being applied to the air bags 87 and 88. When the plunger head 70 is lowered into place onto the mold 50 under the operation of a pair of hydraulic plunger head cylinders 90 and 91, a point is reached, as shown in FIG. 1, where the plunger head 70 rests on the materials in the cavities of the mold 50. When this occurs, the plate 71 no longer is held up by the head of the bolt 77, but assumes the intermediate position shown in FIG. 9 where the pressure of the air in the air bags 87 and 88 establishes the pressure at which the plunger head 70 is pressed against the material in the mold 50. The plates 74 and 75, during this molding step of operation of the machine, are at an intermediate position, as determined by the operation of the hydraulic cylinders 90 and 91; and the plate 71 is intermediate the lower limiting portion of the bolts 77 and 78 and intermediate threaded stops 93 and 94 placed respectively on the bolts 77 and 78.

Figure 10:
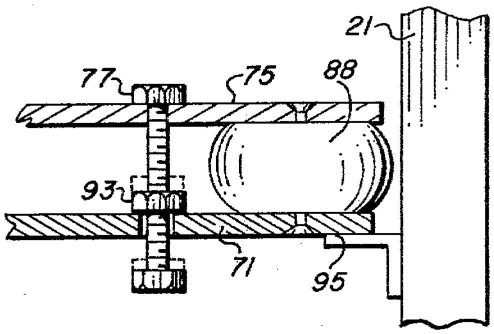

As the concrete in the mold 50 compacts, the air bags 87 and 88 press the plate 71 (and plunger head 70) downwardly until it first reaches the position shown in FIG. 10. The bolts 77 and 78, and intermediate stops 93 and 94 are in the dotted line position shown in FIG. 10. This is the lowermost or limiting position of the plunger head; and this position is sensed by a limit switch (of any suitable conventional type) on at least one leveling stop in the form of an L-shaped bracket 95, one of which is located on each of the four vertical upright members 21 of the main frame 20 of the machine. When the limit switch is operated, the pistons 90 and 91 extend fully to lock the plate 71 tightly against the stops 95. The intermediate threaded stops 93 and 94 then reach the solid line position in FIG. 10 and serve as limit stops to limit the amount of downward travel of the plates 74 and 75 relative to the plate 71 which can be obtained by the machine and effect this locking of the plate 71. Once the position shown in FIG. 10 has been reached by the plate 71 (and therefore by the plunger head 70), the molding operation is completed and the concrete blocks which have been formed in the mold to be removed from the mold and a new cycle of operation started.

Figure 9:
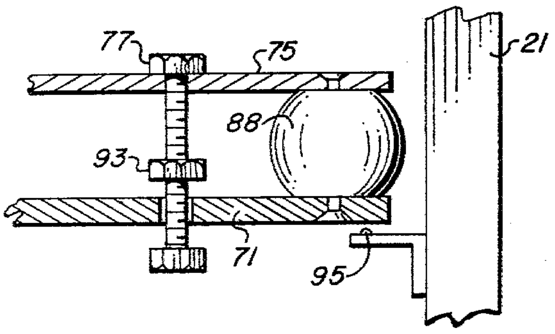
FIGS. 9 and 10 show details of other parts of the apparatus of FIGS. 1 and 2 in various operating positions.

It should be noted that during the molding operation, the air bags 87 and 88 completely isolate the plunger head 70 and its mounting plate 71 from the components attached to the main frame of the machine, namely the plates 74 and 75. During the molding operation, the intermediate position of the plate 71 relative to the plates 74 and 75 shown in FIG. 9 is attained by the machine. Thus, the plunger head 70 is subjected to vibrations by the movement of the material in the mold 50, but these vibrations are merely transmitted to the plate 71 and are not applied to the plates 74 and 75 because of the isolation provided by the air bags 87 and 88.

As is well known, the vibrations of the mold box in concrete block making machines are limited, to the extent possible, to vertical vibrations. Thus, the plate 71 is permitted to vibrate vertically and the plunger head carried by this plate also vibrates vertically. To guide this vibration and to keep the plunger head aligned during the operation of the machine, alignment guide members are located at an angle of 45° to the main dimensions of the plunger head carrying plate 71 to permit vertical movement of the plate 71 and the plunger head 70 relatively to the plates 74 and 75 while preventing movement in any other direction. These guide members are shown most clearly in FIGS. 1 and 2 and the details are illustrated in the inset FIG. 1A. The four guides for the plunger head plate 71 are mounted above the plate on a rectangular frame 94' which has a pair of support plates 96 and 97 attached across its upper surface at each end adjacent the plates 74 and 75. The height of the frame 94' which is welded to or otherwise attached to the upper surface of the carrying plate 71 and the thickness of the plates 96 and 97 are selected to cause the upper surfaces of the plates 96 and 97 to be aligned with the upper surfaces of the plates 74 and 75 in the normal operation of the machine.

A pair of vertical guide members 100 and 101 are attached to each of the plates 96 and 97 at angles of 45° across the corners of the frame 94', as best shown in FIG. 1. Similarly aligned vertical guide members 103 and 104 are attached to corresponding support arms 106 and 107 welded to the upper surfaces of the plates 74 and 75. The surfaces of the members 100 and 103 (and also the members 101 and 104) are spaced from one another and a block 110 of suitable bearing material, such as nylon, is attached in any suitable fashion to the surface of each of the members 100 and 101. The block 110 is not attached to the mating surface of the plates 103 or 104. As a result the plates 96 and 97 (and therefore the plunger head carrying plate 71) are free to move vertically relative to the plates 74 and 75, as indicated by the arrow in FIG. 1A. The air bags 87 and 88 isolate the vertical vibrations between the plate 71 and the plates 74 and 75, while the bearing surfaces provided by the members 100, 101 103, 104 and blocks 110 ensure proper alignment of the plunger head 70 relatively to the location of the mold 50 during the operation of the machine.

Once the plunger head 70 has reached the position shown in FIG. 10 to operate the limit switch located on at least one of the leveling stop brackets 95, a signal is applied to the control mechanism (not shown) for the machine to stop the operation of the vibrators 55. After the vibration has been stopped, the air cylinders 64 are operated to push the wedges 62 toward the center of the machine (as viewed in FIG. 8) to move the wedges 62 clear of the ends of the hook-shaped portion of the wedge receiving members 60, as indicated in the solid line position of FIG. 5. This then releases the pallet support table, mold 50 and pallet 47 from one another and permits them to be separated.

Figure 11:
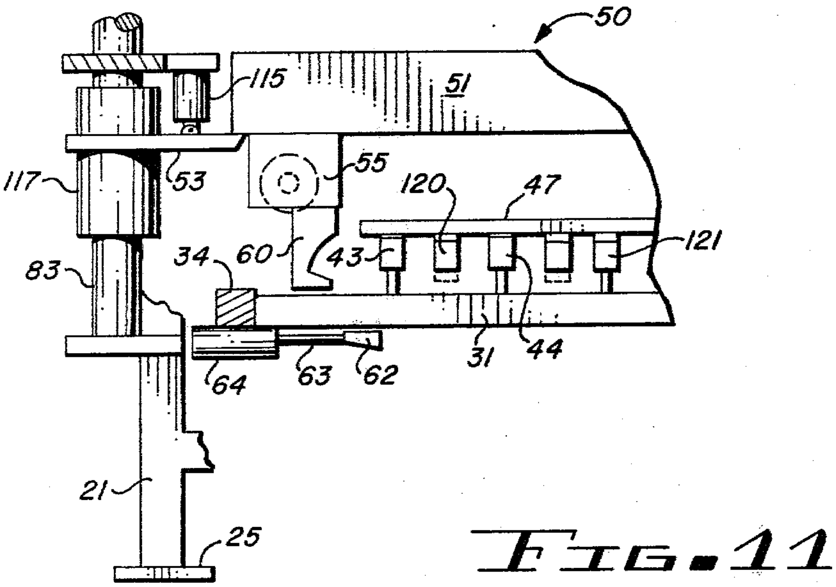
FIG. 11 is a partially cut away diagrammatic representation of the apparatus of FIG. 8 showing the parts in a different operating position from the position shown in FIG. 8.

Next in the cycle of operation of the machine, a pair of mold stripping cylinders 115, located on each side of the machine (only one of which is shown in FIG. 8 since the machine is symmetrical as viewed from the front), are operated to pull upwardly the mold stripping plates 53 located on each side of the machine. The mold stripping plates 53 are mounted on guide tubes 116 and 117, which are guided, respectively, on the guide rods 83 and 84 attached to the main frame of the machine on each side. As the stripping plates 53 are raised upwardly, they catch the underside of the opposite ends of the mold box members 51 and 52 and raise the mold 50 vertically to the position shown in FIG. 11. In this position, the mold is stripped from and lifted above the concrete blocks which had been formed in it, and these blocks remain on the pallet 47. As shown in FIG. 11, the pallet support table remains in the same position it occupied during the molding operation of the machine since it is firmly attached to the wheels on which the tires 37 are mounted, so that it occupies a relatively fixed position (except for the limited vibration permitted by the tires 37) during the entire operation of the machine.

The plunger head cylinders 90 and 91 then are activated to pull up the plates 74 and 75 to the position shown in FIGS. 7 and 8. This raises the plunger head 70 above the feed drawer 65 to permit the feed drawer 65 to be rolled forward and backward over the mold to fill the mold with concrete for the next group of blocks to be molded by the machine.

After the mold has been stripped upwardly off of the green concrete blocks, and the plunger head 70 has been raised, the pallet 47 is lifted off the pallet support table by means of a pair of pallet lifting and moving rails 120 and 121 (FIGS. 1, 8 and 11). These rails roll outwardly toward the left (as viewed in FIG. 1) to carry the pallet 47 and green concrete blocks out of the machine. At the same time, a new pallet is placed in position underneath the mold 50. After the pallet of concrete blocks is removed from the pallet removal bars 120 and 121 in any suitable fashion conventionally used in the industry, the bars 120 and 121 are lowered and moved back in preparation for the next pallet removal portion of the machine operating cycle. When the bars 120 and 121 are lowered, the new pallet 47 is lowered to rest on the top of the members 43, 44 and 45 of the pallet support table and a new cycle of operation of the machine may commence.

The next cycle of operation of the machine is commenced by lowering the stripping plates 53 by the mold strip cylinders 115, and the mold 50 rests on top of the new pallet 47. In this position, the air cylinders 64 are again activated to pull the wedge bars 62 into engagement to wedge the wedge receiving clamp members 60 and the undersides of the pallet support table frame members 31 and 32 together as described previously. A new load of concrete is placed in the mold, the vibrators 55 are re-energized, the plunger head 70 is lowered into place and the molding portion of the cycle of operation, described previously, is repeated.

The machine continuously operates under control of control circuitry (not shown) which may be of various conventional types. The isolation of the pallet support table by means of the tires 37 and of the plunger head by means of the air bags 87 and 88 significantly reduces the stress and stain on the machine caused by the vibration of the heavy masses comprising the pallet support table, pallet, mold and the concrete which is being used to form the blocks. As stated previously, the vibration isolation also significantly cuts down the noise level of the machine and eliminates the necessity for heavy anchoring of the machine frame to some type of foundation.

Figure 12:
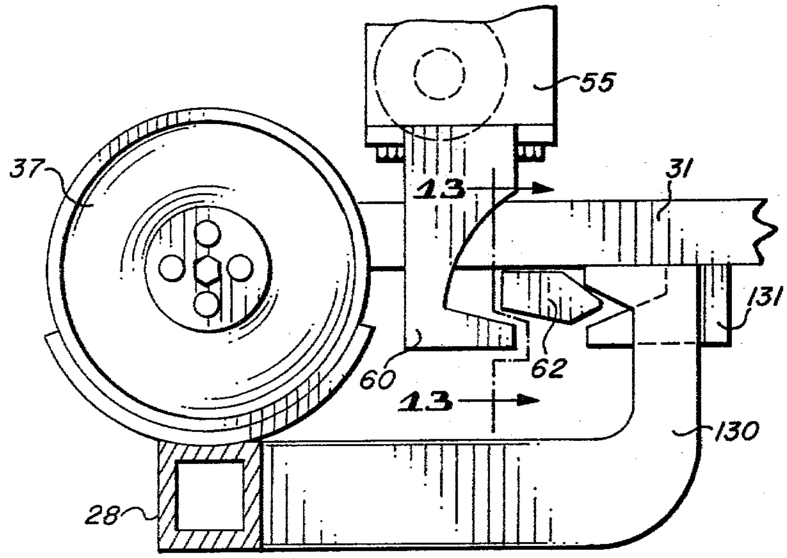
FIGS. 12 and 13 illustrate a modification which may be added to the apparatus shown in the other Figures.
Figure 13:
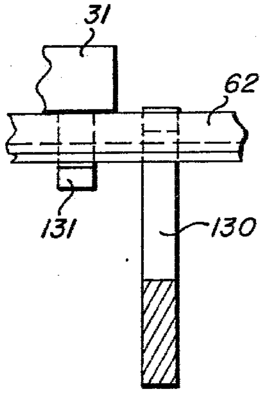

Because of the resilient mounting of the pallet support table by means of the tires 37, it may be possible, in some high speed operation of machines constructed in accordance with the embodiment discussed above, that the pallet support table may have some slight residual bounce in it during the time the mold 50 initially is stripped upwardly, and possibly even at the time when the pallet removing bars 120 and 121 are moved upwardly and outwardly to remove the pallet with the green blocks on it from the machine. In such an event, the modification shown in FIGS. 12 and 13 may be employed to positively lock the pallet support table in a fixed position relative to the main frame 20 of the machine. This modification consists of four pairs of mating wedge clamp receiving members 130 and 131 attached to the main frame members 28 and 29 and the horizontal table frame members 31 and 32, respectively, as shown in FIG. 12. The wedge 62 then has its cross section altered to the shape shown in FIG. 12. When it is moved to the release position for the mold 50, as shown in FIG. 12, it engages the clamp receiving members 130 and 131 to wedge them together as shown in FIG. 12, locking the pallet support table securely to the main frame of the machine when the mold is stripped upwardly and the pallet 47 is removed from the machine. FIG. 13 is a cross sectional end view illustrating the relative locations of the members shown in FIG. 12 when the wedge 62 is in place to secure them together.

In the foregoing description, the limit of downward travel of the plunger head 70 was described as being sensed by a limit switch located on at least one of the leveling stops 95. This requires relatively uniform thicknesses of the pallets 47, and uniform and unvarying inflation of the tires 37, however, to be a consistently reliable point for measuring the completion of the molding operation.

If the thickness of the pallets 47 and inflation of the tires 37 are not uniform or are not easily controlled, an alternative is to provide a sensing switch on an elongated arm carried, for example, on the plunger head support plate 71 which touches a corresponding surface on the upper side of the mold 50 when the plunger head has reached its maximum downward penetration into the mold 50. Such a sensing switch and its mounting is indicated as the slide-mounted switch 160 in FIG. 7.

Other modifications of the machine also will occur to those skilled in the art without departing from the invention as defined in the appended claims.

We claim:

1. A molding machine including in combination:

a machine frame member;

a support table;

a mold member located above said support table and adapted to be freely supported thereby;

vibration isolation means for resiliently mounting said support table in a fixed position on said machine frame member;

means for lowering said mold member onto said support table for free support thereby and for lifting said mold member away from said support table;

clamp means on one of said table and said mold member;

clamp receiving means on the other of said table and said mold member;

drive means for relatively moving said clamp means and said clamp receiving means into engagement with one another to clamp said support table and said mold member together when said mold member is supported by said support table; and said vibration isolation means isolating vibrations of said support table and said mold member from said frame member when said table and said mold member are clamped together.

2. The combination according to claim 1 wherein said means lowering and lifting said mold member operates in cooperation with said drive means to lift said mold member upwardly off said support table when said drive means disengages said clamp means from said clamp receiving means.

3. The combination according to claim 1 wherein said vibration isolation means for said support table comprise pneumatic tire means mounted on wheel means connected to said support table, peripheries of said tire means being connected to said frame member.

4. The combination according to claim 1 further including plunger means having first and second portions, the first portion of which is movably carried on said machine frame member for vertical movement toward and away from said mold member, and the second portion of which has a plunger member thereon for engagement with said mold member, said second portion being mounted on said first portion by further vibration isolation means for providing isolation of vibrations of said mold member, said second portion and said plunger member from said first portion when said plunger member engages said mold member.

5. The combination according to claim 4 wherein said further vibration isolation means comprise pneumatic vibration isolation members.

6. The combination according to claim 1 wherein said support table is a support table for pallets; said mold member has an open end located above said support table; and said support table and said mold member are clamped together on opposite sides of a pallet by engagement of said clamp means and said clamp receiving means to secure said support table, a pallet, and said mold member together.

7. The combination according to claim 6 further including vibration means carried on one of said support table and said mold member for imparting vibrations thereto.

8. The combination according to claim 7 wherein said vibration means is carried on said mold member.

9. The combination according to claim 6 wherein said support table has an upper surface, said clamp receiving means comprises at least one hook-shaped member mounted on said mold member and depending therefrom downwardly a distance extending below the upper surface of said support table when said mold member is supported thereby, and said clamp means comprises a wedge moved by said drive means to engage said hook-shaped member and a portion of said support table in a tightly wedged relationship.

10. The combination according to claim 9 wherein said drive means drives said wedge between first and second positions, the first position thereof engaging said hook member and a portion of said support table in said tightly wedged relationship and further including cooperating wedge receiving members on said support table and said machine frame member for engagement by said wedge in the second position thereof to engage said table and said frame member together and disengage said wedge from said hook-shaped member to permit separation of said mold member and said support table.

11. The combination according to claim 10 wherein said means for lowering and lifting said mold member operates in cooperation with said drive means to lift said mold member upwardly off said support table when said drive means drives said wedge to the second position.

12. The combination according to claim 11 further including vibration means carried on one of said support table and said mold member for imparting vibrations thereto.

13. The combination according to claim 14 wherein said vibration means is carried on said mold member.

14. The combination according to claim 13 further including plunger means having first and second portions, the first portion of which is movably carried on said machine frame member for vertical movement toward and away from said mold member, and the second portion of which has a plunger member thereon for engagement with said mold member, said second portion being mounted on said first portion by further vibration isolation means for providing isolation of vibrations of said mold member, said second portion and said plunger member from said first portion when said plunger member engages said mold member.

15. The combination according to claim 14 wherein said further isolation means comprise pneumatic vibration isolation members.

16. The combination according to claim 4 further including a slide mounted sensing switch carried on said plunger means for engaging an upper surface of said mold member when the plunger member of said plunger means has reached a predetermined maximum downward position with respect to said mold member so that said sensing switch provides an indication of said predetermined maximum downward position.

* * * * *